Figure 1:
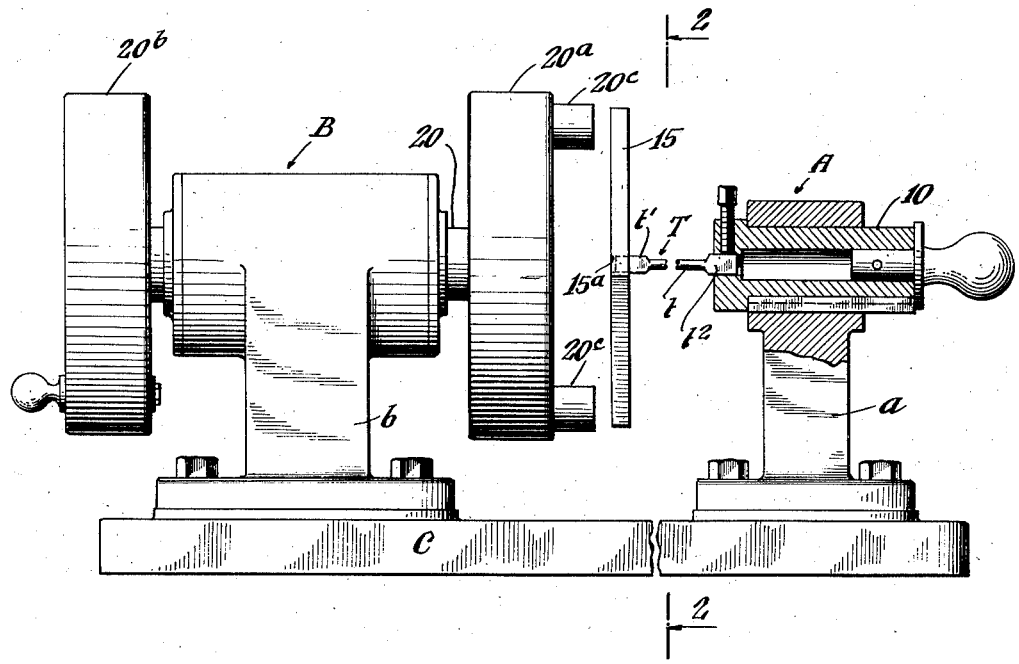

June 12, 1934.  G. V. LUERSSEN ET AL  1,962,604

TORSIONAL IMPACT TESTING MECHANISM

Filed March 1, 1932

INVENTORS
George V. Luerssen
Omar V. Greene
BY
ATTORNEYS

Patented June 12, 1934

1,962,604

UNITED STATES PATENT OFFICE 1,962,604

TORSIONAL IMPACT-TESTING MECHANISM

George V. Luerssen and Omar V. Greene, near Reading, Pa., assignors to The Carpenter Steel Company, Reading, Pa., a corporation of New Jersey Application March 1, 1932, Serial No. 595,982

6 Claims. (Cl. 265—13)

Our invention relates to the testing of materials for determining their shock-resisting quality; the frequent need of such quality in greater or less degree in very hard steels, and the well recognized desirability of definite information in this connection being particularly in view, though the advantages of our satisfactory testing as to such quality obviously extends to other materials in which similar hardness with incidental brittleness is apt to limit the field of practical useability, and even to relatively soft materials which are apt to be subjected to impact shocks in service.

It is commonly assumed that materials having great hardness should not be expected to also possess shock-resisting properties; but there is a limited range of variability attainable in even such material, without objectionable impairment of their essential quality; and a reliable and accurate device for testing for impact has therefore been long desired, not only to enable proper selection of the best practicable material for each of the widely different uses for which it may be wanted, but in order to make possible systematic and reliable production and specific recommendation by the manufacturer.

The methods heretofore used for testing materials for impact or shock resistance quality, have not been adapted for the satisfactory determining of it in the case of hard materials having a low degree of ductility with resulting relatively low impact resistances requiring nicety of measurement to distinguish regarding it. Thus in the well known transverse-test methods, when the specimens or test pieces are notched transversely the impact stress is concentrated with resulting values so low that the slight differences in impact resistance cannot be satisfactorily measured,—even when the notch is provided by grinding the hardened material to avoid the danger of cracking or weakening incident to hardening subsequently; while in cases where the notching is dispensed with the transverse stresses are not only more or less concentrated at the point of impact of the lateral impact tool, but the fracture is apt to be indefinite and to occur at an accidental surface nick, with resulting unreliable as well as inadequately distinguishing measurements. A tension-impact method which has also been resorted to, results in similar more or less erratic results with lack of sufficient sensitiveness to bring out the relatively slight differences in impact-resistance quality which our invention provides for clearly and reliably measuring.

Figure 2:
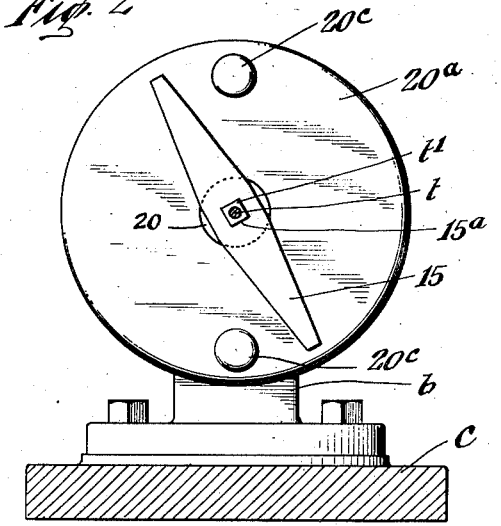

In our improved mechanism for testing hard materials for impact or shock-resisting quality, as hereinafter fully set forth impact stress is applied torsionally to a rigidly held specimen or test piece having a substantial lengthwise portion of uniform cross-section for distribution of the strain, with accurate measuring of the amount of such torsional-impact stress required to cause fracture. A simple mechanism is illustrated herewith as adapted and practically used by us to satisfactorily embody our invention; Fig. 1 of the drawing showing an elevation, with the test-piece held in withdrawn position, and Fig. 2 being an end view of the engaging fly wheel with the test-piece shown in cross-section.

This illustrative mechanism consists essentially of a test-piece holding means A, and a momentum-impact means B; these being respectively mounted, as shown, on standards $a$ and $b$ fixed to a base plate C; and said impact means being adapted to permit of determining the mechanical momentum at the moments of impact and of breakage of the test piece, by ordinary speedometer readings.

The test-piece T which is to be subjected to measured torsional-impact stress to determine the impact-resisting value of such material, is formed with a body portion $t$ of uniform determined-area cross-section, and of determined length for axially distributing the torsional-impact stress applied; and with opposite angular-section head-portions $t'$, $t2$. One of these heads is shown as fixedly clamped in a non-rotatable but axially movable sleeve 10 of the holding means A, so as to be freely projected axially by the operator; while the outer head is adapted to simply engage in a central aperture $15^a$ of a torsioning cross-bar 15 removably applicable thereto and projectable therewith, as indicated, into the path of the path of the impact means B.

The momentum-impact means B, as shown, comprises a fly-wheel shaft 20, which is non-frictionally mounted horizontally in the fixed standard $b$ so as to be very freely rotatable therein without axial movement; and balanced fly-wheels $20^a$ and $20^b$ fixed to the oppositely projecting ends of said shaft: One of these fly-wheels, $20^a$, being provided on its outer face with a pair of cross-bar-engaging projections $20^c$, $20^c$, arranged to simultaneously and symmetrically contact with the oppositely extending arms of said cross bar 15 when the latter is moved into their path of rotation; while the similar fly-wheel $20^b$, at the other end of shaft 20, is adapted to be conveniently rotated by hand as indicated, up to any desired speed, and the momentum at any indicated speed being determinable by well-known formula. The movement of the test piece T and its applied cross-bar 15 into the path of the rotating fly-wheel projections 20c, 20c, is effected, as shown, by simply moving axially the non-rotatable sleeve 10 of holding means A, which movement the operator quickly effects by hand at any desired moment.

The testing by torsional impact, as effected by the simple mechanism illustratively indicated, will be readily understood; the momentum-impact means being in practice, rotated by the operator up to a speedometer—indicated speed in excess of that known or assumed-to-be required to provide the breaking stress; and the previously secured test-piece T, in the slidable holding sleeve 10, being conveniently moved axially into engagement of its cross-bar 15 with the fly-wheel projections 20b, at the moment when the speed of rotation has been predeterminedly reduced. The momentum-impact thus torsionally applied, is absorbed in breaking the test-piece with lengthwise distribution of the stress as determined by the uniform cross-section, provided, enabling reliable determination of differences in shock-resisting quality such as have heretofore been actually indeterminate; the avoidance of concentration of the strain at any point of the test-piece being evidenced at times, with a long extension of the uniform cross-section such as is hereinafter preferredly mentioned by cross-wise breakage simultaneously at separated points in the length of such portion of the test piece, without affecting the reliability of the indicated breaking value. The speeds of rotation at the moments of impact and of breakage respectively, as required for determining the momentum absorbed in effecting breakage, may be conveniently read upon an ordinary speedometer applied to the fly-wheel in well known manner.

As indicating the certainty and nicety with which small differences in impact values may be determined by means of our invention, and the consistency and reproducible character thereof, we give the following relative impact values obtained by our device with one-quarter inch diameter test pieces, which when tested by previously known methods show substantially equal and therefore practically useless figures:

*Steels containing 1.00 per cent carbon, 1.50 per cent chromium;— test pieces ¼ inch diameter for one inch.*

| Heat treatment | Hardness | Torsion impact |
|---|---|---|
| Water quenched 1475 F. not drawn. | C—62 Rockwell | 24-27½ ft. lbs. |
| Water quenched 1475 F. drawn 275 F. 1 hour. | C—60 Rockwell | 42-37 ft. lbs. |
| Water quenched 1475 F. drawn 275 F. 4 hours. | C—60 Rockwell | 89-91 ft. lbs. |

It will be understood that the essential operation of our improved mechanism subjects the test piece to a determinable momentum-impact strain torsionally applied up to the point of breakage, with measurement of the momentum-impact strain absorbed in thus effecting breakage; the nicety of measurement required to differentiate as to the shock-resisting quality, as between test-pieces varying only slightly in analysis and heat treatment or either, being enabled only, to our knowledge, by such torsional-impact testing with the indicated differentiation increased by extension of the uniform cross-section to avoid concentration of the stress. The preferred type of mechanism particularly set forth may obviously be modified without departing from the invention as defined in the claims.

What we claim is:

1. In a testing mechanism for steels and the like, the combination with means for non-rotatively holding a test piece in axially variable position, of a cross bar non-rotatably engageable on said test piece and rotary impact mechanism adapted to engage said cross-bar when the test piece is moved axially to breakingly impart measurable torsional impact stress to the test piece.

2. A testing mechanism for determining impact value, comprising a test-piece holder adapted to non-rotatably grip one end portion of a test piece, a crossbar fixedly engageable upon the free-end portion of the test piece, and a momentum-impact member engageable with said crossbar to impart a fracturing torsional impact to the test piece with determinable loss of momentum at the moment of fracture.

3. In a torsional impact-testing mechanism, the combination with a momentum impact wheel having cross-bar-engaging means, of a test-piece holder adapted to non-rotatably grip one end portion of a test piece, and a cross-bar non-rotatably engageable upon the other end portion thereof and axially engageable with said wheel to impart a rupturing impact to the test piece.

4. A torsional impact-testing mechanism comprising means for non-rotatively gripping one end of a test piece, and a momentum-impact mechanism comprising means for torsionally engaging the same with the free end of said test piece by relative axial movement so as to breakingly apply a measurable torsional impact to the test piece.

5. A torsional impact-testing mechanism comprising means for non-rotatively gripping one end of a test piece, and a momentum-impact mechanism comprising means for establishing positive torsional engagement of the same with the free end of said test piece while the momentum-impact mechanism is in motion so as to breakingly apply a measurable torsional impact to the test piece.

6. In a testing mechanism for steels and the like, the combination with gripping means for one end of a test piece, and a cross-bar engageable on said test piece, of projections engageable with said cross-bar by relative axial movement, and an impact mechanism adapted to turn said cross-bar when the latter is brought into engagement with said projections so as to breakingly impart measurable torsional impact to the test piece.

GEORGE V. LUERSSEN.
OMAR V. GREENE.